W. D. NEEL.
PROCESS OF PRODUCING A MEDICAMENT.
APPLICATION FILED JULY 5, 1902.

925,590.

Patented June 22, 1909.

Witnesses
Edward T. Wray.

Inventor
William D. Neel
By Parker & Carter
Attorneys

UNITED STATES PATENT OFFICE.

WILLIAM D. NEEL, OF CHICAGO, ILLINOIS, ASSIGNOR, BY DIRECT AND MESNE ASSIGNMENTS, OF ONE-HALF TO THE OXOLINE COMPANY, OF JERSEY CITY, NEW JERSEY, A CORPORATION OF NEW JERSEY, AND ONE-HALF TO NEEL-ARMSTRONG CO., A CORPORATION OF MAINE.

PROCESS OF PRODUCING A MEDICAMENT.

No. 925,590.     Specification of Letters Patent.     Patented June 22, 1909.

Application filed July 5, 1902. Serial No. 114,365.

*To all whom it may concern:*

Be it known that I, WILLIAM D. NEEL, a citizen of the United States, residing at Chicago, in the county of Cook and State of Illinois, have invented a certain new and useful Improvement in Processes of Producing Medicaments, of which the following is a specification.

My invention relates to a new and improved process for producing a new and improved medicament.

My invention is illustrated in the accompanying drawings, wherein—

Figure 1:
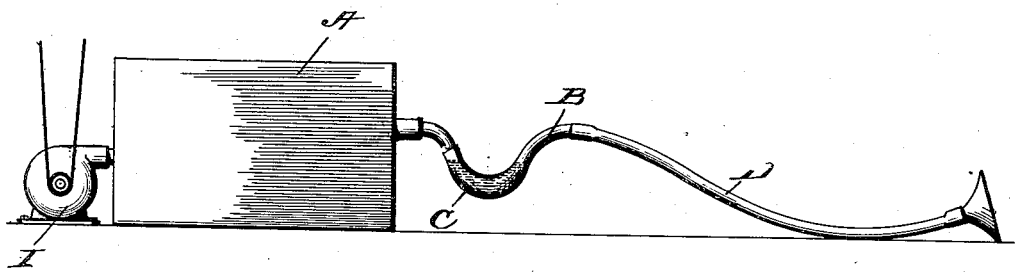
Figure 2:
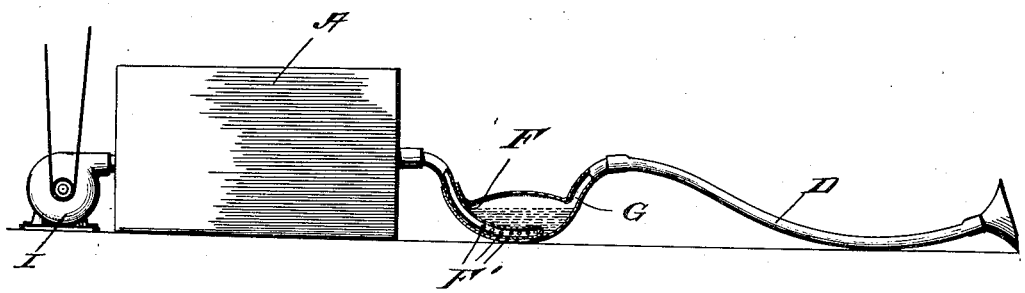

Figure 1 is a view showing one arrangement for carrying my process into effect; Fig. 2 shows a modified construction.

My present process relates to the production of a medicament particularly adapted to diseases of the blood and the respiratory organs, such as consumption, asthma, syphilis and the like.

Briefly stated, my invention may be said to consist in bringing an active oxidizing agent into proximity to or in contact with a hydrocarbon oil of the terpene group, the resultant product being administered to the patient in an inhalable form.

Referring now to the drawing, in Fig. 1 I have shown one apparatus for carrying my process into effect. In this apparatus, I provide a device A for making or generating ozone. This device may be of any of the suitable constructions for this purpose which will generate sufficient ozone, for unless sufficient ozone is generated no useful results can be secured. Connected with the ozone generator is a tube or receptacle B, preferably of glass and also preferably bent so as to form a trap as indicated. In this tube I place an oil C, that is a hydrocarbon oil of the terpene group, and the parts are so arranged that the ozone passes through this oil. The resultant product is then passed through a suitable confining device D and is administered to the patient, the patient inhaling such resultant product. I have found that various oils may be used in connection with the ozone, such for example as eucalyptus oil, oil of pine needles, oil of juniper berries, and the like that is a hydrocarbon or volatile oil of the terpene group.

In Fig. 2, I have shown a different arrangement of carrying my process into effect. In this construction, the ozone generator A is connected to a tube F, which is closed at the end, but which has along a portion of its length a series of openings $F^1$. The tube is contained in a vessel G which contains the oil. The tube D is connected with this vessel so as to conduct the resultant product to the point desired. The ozone, in passing through the openings $F^1$, is thus brought into intimate contact with the oil and the direction of the movement of the ozone is such as to prevent the oil from being forced out into the tube D.

I have found that ozone cannot well be administered to the patients, because of the fact that it is an irritant and causes violent fits of coughing when administered, particularly to patients afflicted with lung diseases. It was in the attempt to use ozone that I discovered my present invention. I have experimented with this medicament, my experiments extending over a long period of time, and have administered it to numerous people and noted the effect it produced and have watched these people to see if the effect was permanent. My experiments covering this long period have convinced me of its efficacy in curing consumption, asthma and other diseases of the respiratory organs, as well as diseases of the blood. I find that this medicament, when properly administered, increases the red blood corpuscles and hemoglobin and has a general beneficial action upon the system. This medicament when inhaled heals suppurative processes and renders the tissues unsuitable for the propagation of germs in such diseases as consumption and syphilis and stops its progress, thus curing the patients. This resultant product or medicament does not have the effect upon the patient of ozone and I have subjected it to tests and found that it is practically free from the ozone test. This medicament may be inhaled or may be applied directly to the parts affected.

In the drawings I have only attempted to illustrate some simple apparatus for carrying my process into effect. I may use various other apparatus. I may, for example, permit the resultant product to pass into the room, or I may confine it in receptacles which may be sent to the patient, or I may use various other methods and arrangements. I therefore do not limit myself to the apparatus and method described.

I have shown my apparatus diagrammatically for purposes of illustration. Any of the oils belonging to the class herein described may be used alone or two or more of such oils may be mixed. It is of course evident that all such details will depend upon the conditions to be met and I of course do not limit myself in any such particular.

I prefer to provide some means for producing a circulation through the ozone generator. Any desired means for this purpose may be used and I have shown for purposes of illustration a fan I. This fan, or as it is perhaps more properly termed flower, raises the ozone and air to a pressure superior to the surrounding atmosphere. This pressure, can, of course, be regulated by the speed of the blower. The ozone generator, as before stated, may be of any suitable construction, such for example as that illustrated in my prior patent No. 642,663.

I prefer to raise the temperature of the eucalyptus or other volatile oil or material through which the ozone is passed, say above 70°. While this is not necessary, it is yet a convenience, and this temperature may be secured in any desired way, as by heating the material before it is placed in the receptacle in which it is used, or after being placed in such receptacle, or the heating effect may easily be produced by simply raising the temperature of the room in which the device is used.

I claim:—

1. The process of producing terpene peroxid, which consists in bringing into contact with a terpene hydrocarbon, in the absence of water, an oxidizing agent of sufficient chemical activity to oxidize the hydrocarbon and cause fumes of the peroxid to be evolved, as set forth.

2. The process of producing an inhalable medicament which consists in bringing into contact with a hydrocarbon oil of the terpene group, in the absence of water a gaseous oxidizing agent of sufficient chemical activity to oxidize the oil and cause fumes of the medicament to be evolved.

3. The process of producing terpene peroxid, which consists in bringing into contact with a terpene hydrocarbon, in the absence of water, ozone or ozonized air, and thereby causing fumes of the peroxid to be evolved, as set forth.

4. The process of producing medicinal fumes for inhalation purposes which consists in forcing ozone through a hydrocarbon oil of the terpene group in the absence of water.

5. The process of producing a medicament which consists in forming ozone and then bringing such ozone into contact with eucalyptus oil so as to produce fumes, said fumes forming the medicament.

6. The process of producing a highly oxidizing vapor which consists in passing ozone in contact with oil of eucalyptus at a pressure superior to the surrounding atmosphere so as to cause vapor to be evolved.

7. The process of producing a medicament which consists in heating a hydrocarbon oil of the terpene group and bringing ozone into contact therewith causing fumes of the medicament to be evolved.

WILLIAM D. NEEL.

Witnesses:
 HOMER L. KROFT,
 FANNY B. FAY.